US012052687B2

(12) United States Patent
Miao et al.

(10) Patent No.: US 12,052,687 B2
(45) Date of Patent: Jul. 30, 2024

(54) METHOD, DEVICE AND COMPUTER READABLE MEDIUM FOR RESOURCE SELECTION

(71) Applicant: NEC CORPORATION, Tokyo (JP)

(72) Inventors: Zhaobang Miao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 232 days.

(21) Appl. No.: 17/419,052

(22) PCT Filed: Dec. 29, 2018

(86) PCT No.: PCT/CN2018/125569
§ 371 (c)(1),
(2) Date: Jun. 28, 2021

(87) PCT Pub. No.: WO2020/133402
PCT Pub. Date: Jul. 2, 2020

(65) Prior Publication Data
US 2022/0086801 A1 Mar. 17, 2022

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/542* (2023.01); *H04W 72/56* (2023.01)

(58) Field of Classification Search
None
See application file for complete search history.

(56) References Cited

U.S. PATENT DOCUMENTS

2017/0257876 A1* 9/2017 Loehr ............... H04W 28/0263
2017/0272384 A1* 9/2017 Lee .......................... H04W 4/46
(Continued)

FOREIGN PATENT DOCUMENTS

CN       105960023 A       9/2016
EP        3636018 B1 * 11/2023  ........... G01S 1/0428
(Continued)

OTHER PUBLICATIONS

International Search Report of PCT/CN2018/125569 dated Sep. 18, 2019 [PCT/ISA/210].
(Continued)

*Primary Examiner* — Kenny S Lin
(74) *Attorney, Agent, or Firm* — Sughrue Mion, PLLC

(57) ABSTRACT

Embodiments of the present disclosure relate to methods, devices and computer readable media for resource selection. In example embodiments, a method for resource selection includes selecting, at a first terminal device, a first resource for transmitting a first packet from a resource pool. The method further includes determining a second resource selected from the resource pool by a second terminal device for transmitting a second packet. The method further includes determining whether a first transmission priority associated with the first packet is lower than a second transmission priority associated with the second packet. The method further includes in response to determining that the first transmission priority is lower than the second transmission priority, selecting an available resource from the resource pool to transmit the first packet.

9 Claims, 5 Drawing Sheets

(51) Int. Cl.
*H04W 72/542* (2023.01)
*H04W 72/56* (2023.01)

(56) References Cited

U.S. PATENT DOCUMENTS

| | | | | |
|---|---|---|---|---|
| 2017/0332352 | A1* | 11/2017 | Sheng | H04W 72/23 |
| 2018/0249470 | A1* | 8/2018 | Seo | H04W 72/53 |
| 2020/0045719 | A1* | 2/2020 | Wang | H04W 72/56 |
| 2020/0280961 | A1* | 9/2020 | Lee | H04W 4/40 |
| 2020/0296690 | A1* | 9/2020 | Lee | H04W 4/40 |
| 2020/0413397 | A1* | 12/2020 | Blasco Serrano | H04W 72/542 |
| 2021/0204301 | A1* | 7/2021 | Lee | H04W 72/566 |

FOREIGN PATENT DOCUMENTS

| | | | |
|---|---|---|---|
| WO | 2015/165029 | A1 | 11/2015 |
| WO | 2018/030825 | A1 | 2/2018 |
| WO | 2018/201415 | A1 | 11/2018 |

OTHER PUBLICATIONS

Written Opinion of PCT/CN2018/125569 dated Sep. 18, 2019 [PCT/ISA/237].

* cited by examiner

METHOD, DEVICE AND COMPUTER READABLE MEDIUM FOR RESOURCE SELECTION

CROSS REFERENCE TO RELATED APPLICATIONS

This application is a National Stage of International Application No. PCT/CN2018/125569, filed Dec. 29, 2018.

TECHNICAL FIELD

Embodiments of the present disclosure generally relate to the field of communication, and in particular, to methods, devices and computer readable media for resource selection.

BACKGROUND

Communication technologies have been developed in various communication standards to provide a common protocol that enables different wireless devices to communicate on a municipal, national, regional, and even global level. An example of an emerging communication standard is new radio (NR), for example, 5G radio access. NR is a set of enhancements to the Long Term Evolution (LTE) mobile standard promulgated by Third Generation Partnership Project (3GPP). It is designed to better support mobile broadband Internet access by improving spectral efficiency, lowering costs, improving services, making use of new spectrum, and better integrating with other open standards.

Vehicle-to-everything (V2X) communication is the passing of information from a vehicle to any entity that may affect the vehicle, and vice versa. It is a vehicular communication system that incorporates other more specific types of communication as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). Since the improvements of NR with respect to LTE, issues regarding NR V2X also need to be specified.

SUMMARY

In general, example embodiments of the present disclosure provide methods, devices and computer readable media for resource selection.

In a first aspect, there is provided a method for resource selection. The method comprises selecting, at a first terminal device, a first resource for transmitting a first packet from a resource pool. The method also comprises determining a second resource selected from the resource pool by a second terminal device for transmitting a second packet. The method further comprises determining whether a first transmission priority associated with the first packet is lower than a second transmission priority associated with the second packet. The method further comprises in response to determining that the first transmission priority is lower than the second transmission priority, selecting an available resource from the resource pool to transmit the first packet.

In a second aspect, there is provided a method for wireless transmission. The method comprises receiving, at a first terminal device, information about a resource selected from a resource pool by a second terminal device. The method further comprises selecting, based on the received information, an available resource from the resource pool for packet transmission.

In a third aspect, there is provided an apparatus for resource selection. The apparatus includes a processing unit; and a memory coupled to the processing unit and storing instructions thereon, the instructions, when executed by the processing unit, causing the apparatus to perform the method according to the first aspect.

In a fourth aspect, there is provided an apparatus for wireless transmission. The apparatus includes a processing unit; and a memory coupled to the processing unit and storing instructions thereon, the instructions, when executed by the processing unit, causing the apparatus to perform the method according to the second aspect.

In a fifth aspect, there is provided a computer readable medium having instructions stored thereon, the instructions, when executed on at least one processor, causing the at least one processor to carry out the method according to the first aspect.

In a sixth aspect, there is provided a computer readable medium having instructions stored thereon, the instructions, when executed on at least one processor, causing the at least one processor to carry out the method according to the second aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
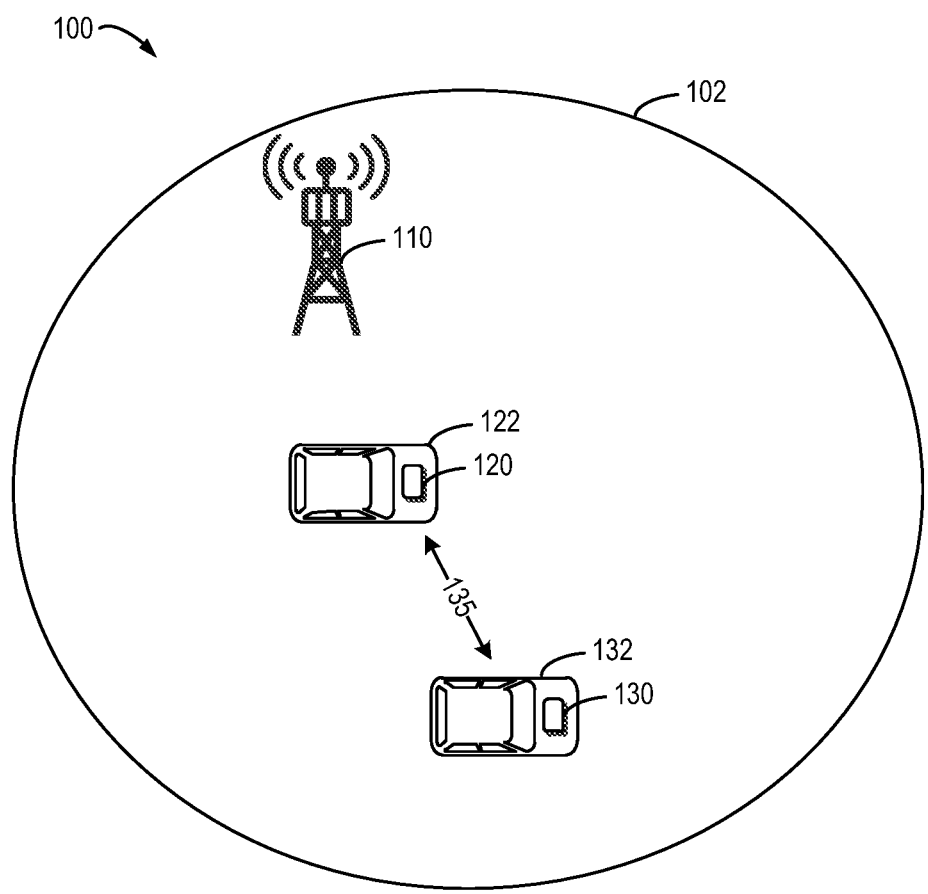
FIG. 1 is a schematic diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As mentioned above, issues regarding NR V2X need to be specified, in particularly with respect to allocation of sidelink resources. For example, when UEs (e.g., terminal devices associated with different vehicles) autonomously selects sidelink resources for transmission, it is inevitable that resources selected by different UEs collide with each other. In this situation, resource collision is encountered. Therefore, resource selection mechanisms need to be specified to resolve this issue.

In UE autonomous resources allocation modes for LTE V2X, ProSe Per-Packet Priority (PPPP) and/or ProSe Per-Packet Reliability (PPPR), which are configured by application layer, are considered. While the LTE V2X transmission priority works well for Mobile broadband (MBB) packets, the current PPPP mechanism is actually not easily applicable to Ultra-Reliable Low-Latency Communication (URLLC) transmission on mini slots.

The NR V2X traffic is characterized by combination of quality of service (QoS) attributes including priority, latency, reliability, etc. In case of resource constraints, in order to schedule given packet some common rules mat need to be defined. Therefore, the inventors have realized that current PPPP or PPPR mechanism is not applicable for NR V2X with various QoS attributes and new solutions need to be standardized.

Regarding the resource allocation for NR V2X, an approach based on forward booking announcement message has been proposed. In this proposed approach, the UE transmits a notification message in one slot for transmission of data occurring in a later slot. Such message can be used to notify other UEs about its intention to use a transmission resource for data and/or control. Such message is also referred to as forward booking announcement message. The forward booking announcement message contains at least the following parameters: time-frequency location of the data and/or control, priority of the data.

The forward booking announcement message is used as a notification message only. That is, the UE needs to transmit both control and data after transmission of the forward booking announcement message. To resolve the half-duplex issue, multiple repetitions of this message can be performed by the UE.

It is also proposed that the UE may determine to perform resource reselection if the selected resource collides with other UE's transmission and the priority of the pending TB is lower than that of the other UE. However, no specific priority rules are defined for UE's behavior of resource reselection.

Moreover, it is also agreed to study further how to use priority, latency, reliability, and minimum required communication range (as defined by higher layers) if agreed to use in the physical layer aspects of at least the resource allocation, the congestion control, the resolution of in-device coexistence issues and the power control.

Another approach regarding system congestion has been proposed. In this proposal, it is proposed to assign priority order for handling packets with different QoS attributes. However, this proposal only relates to determine which incoming data should be passed to lower layer in the UE. Therefore, specific solutions for resolving the resource collision between multiple UEs need to be studied.

According to embodiments of the present disclosure, there are proposed solutions for resource selection mechanism. In an aspect, when reserved resource collision occurs between two terminal devices, the terminal devices determine whether to perform resource reselection based on the QoS attributes of the different packets to be transmitted and optionally the sending/receiving time of the above mentioned forward booking announcement message (which may also be referred to as booking message for short). In some embodiments, a relative level of transmission priorities for the two terminal devices to transmit the different packets is determined based on a predefined priority order of the QoS attributes of the different packets to be transmitted. In some embodiments, the transmission priority values for the two terminal devices, which are a function of at least some of the QoS attributes, are compared. In this way, the terminal device's behavior after detecting resource collision can be standardized. In another aspect, a terminal device may select available resource for packet transmission based on information from other terminal devices such that resource collision or other potential problem may be avoided.

It is to be understood that the term "transmission priority" is used herein to indicate the priority for transmission of a packet by a terminal device. For example, a transmission priority associated with a packet may indicate the priority for a terminal device to transmit the packet using a reserved resource. It is also to be understood that the resource selection mechanism disclosed herein also applies to piece of information in a form other than a packet.

Principle and implementations of the present disclosure will be described in detail below with reference to FIGS. 1-6.

FIG. 1 shows an example communication network 100 in which embodiments of the present disclosure can be implemented. The network 100 includes a network device 110, and two terminal devices 120 and 130 served by the network device 110. The serving area of the network device 110 is called as a cell 102. It is to be understood that the number of network devices and terminal devices is only for the purpose of illustration without suggesting any limitations. The network 100 may include any suitable number of network devices and terminal devices adapted for implementing embodiments of the present disclosure.

As shown in FIG. 1, the terminal devices 120 and 130 are associated with vehicles 122 and 132, respectively. For example, the terminal devices 120 and 130 may be vehicle-mounted terminal devices. Although the terminal devices 120 and 130 are depicted as located in the vehicles 122 and 132, it is understood that embodiments of the present disclosure are equally applicable to any other terminal devices which enable device to device (D2D) communications. For example, some or all of the terminal devices 120 and 130 may be associated with infrastructures, pedestrians, other devices or grids.

In the communication network 100, the network device 110 can communicate data and control information to the terminal devices 120 and 130, and the terminal devices 120 and 130 can also communication data and control information to the network device 110. A link from the network device 110 to the terminal device 120 or 130 is referred to as a downlink (DL) or a forward link, while a link from the terminal device 120 or 130 to the network device 110 is referred to as an uplink (UL) or a reverse link.

In addition to the communications via the network device 110, the terminal device 120 may communicate with the terminal device 130 via D2D communication links. Although not shown in FIG. 1, there may be D2D communications between the terminal device 120 or 130 and other terminal device not shown. As used herein, D2D communication links for D2D communications among the terminal devices 120 and 130 as well as other terminal devices not shown may be referred to as sidelinks. The sidelink 135 may be half-duplex. Further, in case where the terminal devices 120 and 130 are vehicle-mounted terminal devices, the communications related to the terminal devices 120 and 130 may be referred to as V2X communications.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

When operating in an autonomous resources allocation mode, the terminal devices 120 and 130 may autonomously select resources for transmission from a resource pool. In an aspect, the terminal devices 120 and 130 may perform resource selection based on information from the other terminal devices to avoid resource collision or other potential problem. In another aspect, if the resources selected or reserved by the terminal devices 120 and 130 have collided (for example, fully or partially overlapped) with each other, the terminal devices 120 and 130 upon detection of the resource collision need to determine whether to select other resource for transmission to solve the resource collision problem. In the present disclosure, the resource collision means a situation in which two or more resources are fully or partially overlapped with each other.

Figure 2:
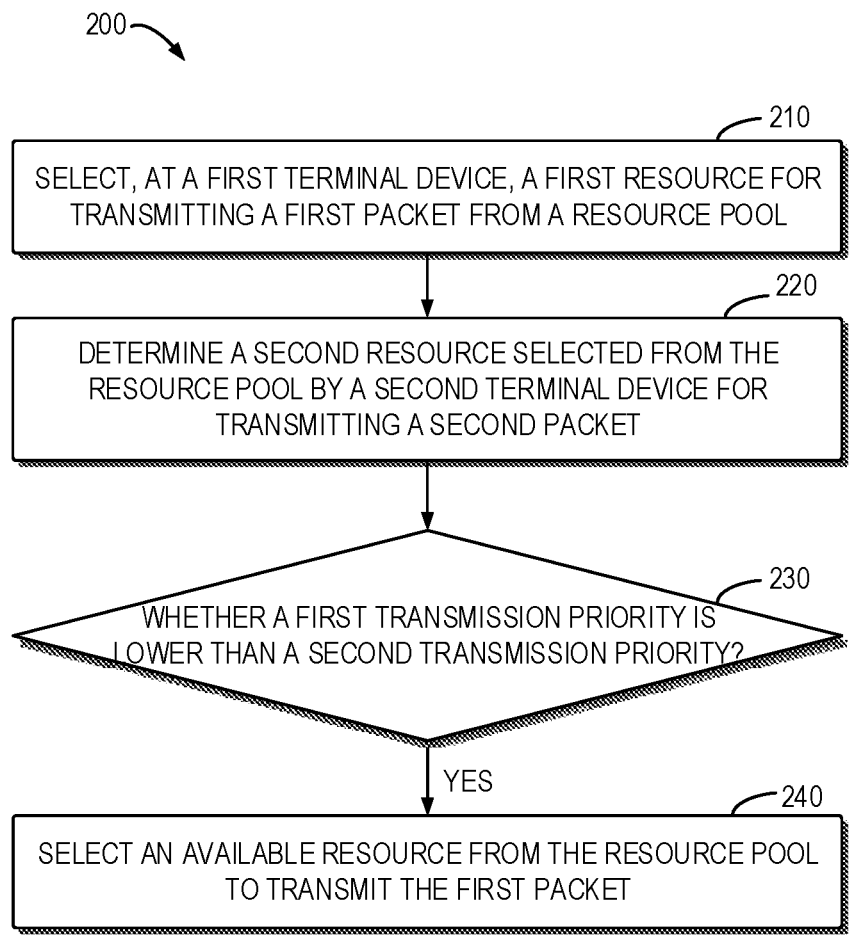
FIG. 2 shows a flowchart of an example method in accordance with some embodiments of the present disclosure.

Now implementations of the present disclosure will be described in detail below with reference to FIGS. 2-6. FIG. 2 illustrates a flowchart of an example method 200 in accordance with embodiments of the present disclosure. It is to be understood that the method 200 may include additional blocks not shown and/or may omit some blocks as shown, and the scope of the present disclosure is not limited in this regard. The method 200 can be implemented at a terminal device, such as the terminal device 120 as shown in FIG. 1. Additionally or alternatively, the method 200 can also be implemented at the terminal device 130, as well as other the terminal devices not shown in FIG. 1.

Only for the purpose of discussion, the method 200 will be described with reference to FIG. 1 as performed by the terminal device 120. In the following description, the terminal device 120 may also be referred to as the first terminal device 120 and the terminal device 130 may also be referred to as the second terminal device 130.

At block 210, the first terminal device 120 selects a first resource for transmitting a first packet from a resource pool. In some embodiments, after selecting the first resource, the terminal device 120 may transmit first information about the first resource selected for transmitting the first packet. As an example, the terminal device 120 may broadcast a message, for example, the forward booking announcement message mentioned above, to notify the other terminal devices (e.g. the terminal device 130) that the first resource have been reserved. The message may include the time-frequency location of the first resource and information related to the first packet to be transmitted. The information related to the first packet may comprise the QoS attributes of the first packet as configured by a higher layer, for example, the packet arrival time, priority, latency, reliability, etc.

At block 220, the first terminal device 120 determines a second resource selected from the resource pool by a second terminal device 130 for transmitting a second packet. The first terminal device 120 may determine the second resource reserved by the second terminal device 130, based on information (which may be included in, for example, a message or other signals) from the second terminal device 130 or from the network device 110. It is to be noted that as used herein, the first and second packets may be any packet to be transmitted by the corresponding terminal device.

In some embodiments, the first terminal device 120 may receive, from the second terminal device 130, second information about the second resource, and determine the second resource from the second information. For example, the first terminal device 120 may determine the second resource from a message transmitted by the second terminal device 130, for example, the forward booking announcement message. The second terminal device 130 may transmit the message after selecting the second resource, similar as described above with respect to the first terminal device 120. Then, the first terminal device 120 may receive the message from the second terminal device 130, and the message may include information about the second resource, such as the time-frequency location of the second resource. The first terminal device 120 may then determine the second resource from the message.

The information transmitted by the second terminal device 130 may additionally include information related to the second packet to be transmitted, for example, the QoS attributes of the second packet as configured by a higher layer. The first terminal device 120 may subsequently use the QoS attributes to determine transmission priorities associated with the first and second packets in order to determine whether to perform resource reselection or not. In such embodiments, information related to the reserved resources and packets to be transmitted is communicated between the terminal devices 120 and 130 via the sidelink. Thus, the communication burden of the network device 110 may be reduced.

At block 230, the first terminal device 120 determines whether a first transmission priority associated with the first packet is lower than a second transmission priority associated with the second packet. For example, the first terminal device 120 may at block 230 compare the first transmission priority and the second transmission priority, based on information about the first and second packets, in particular the QoS attributes of the first and second packets. As mentioned above, the first transmission priority indicates the priority for the first terminal device 120 to transmit the first packet, and the second transmission priority indicates the priority for the second terminal device 130 to transmit the second packet.

In some embodiments, the first terminal device 120 may determine whether the first resource collides with the second resource. If the first resource collides with the second resource, then the first terminal device 120 may determine whether the first transmission priority is lower than the second transmission priority. Now referring to FIG. 3, which shows a schematic diagram 300 illustrating collision between resources reserved by two terminal devices 120 and 130 according to some embodiments of the present disclosure.

Figure 3:
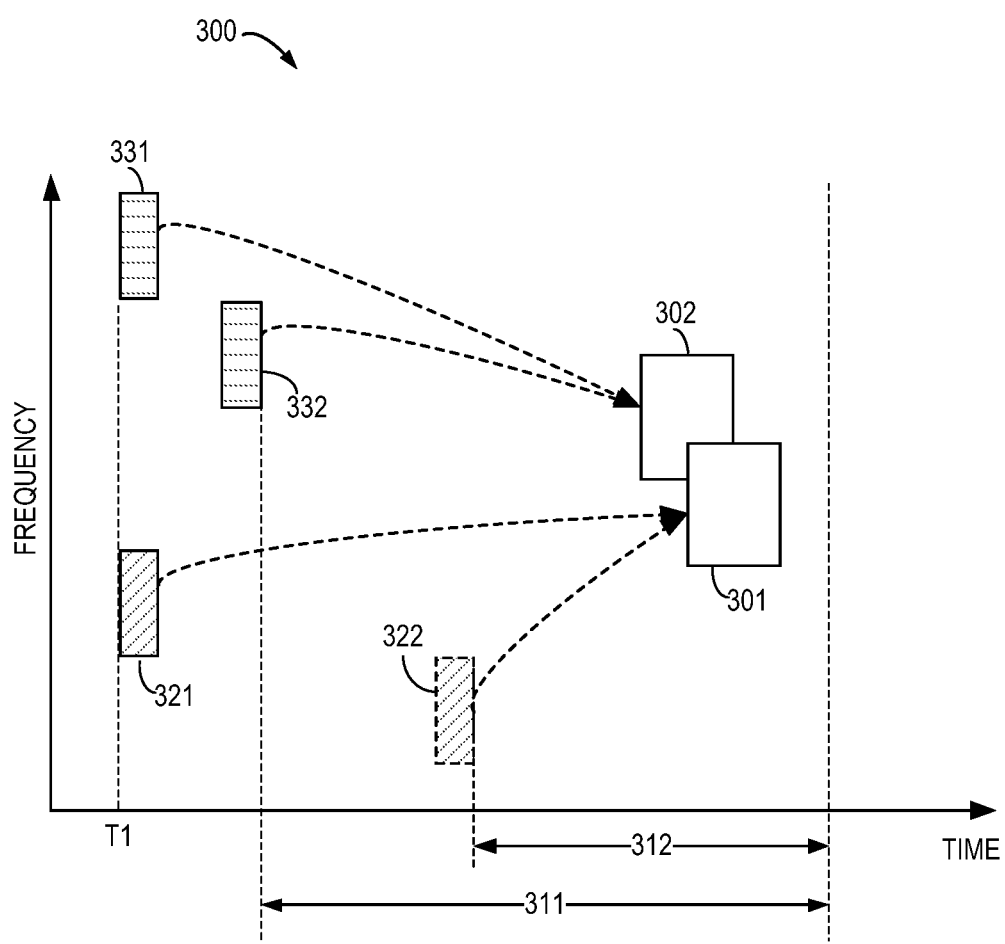
FIG. 3 shows a schematic diagram illustrating collision between resources reserved by two terminal devices according to some embodiments of the present disclosure.

For the example shown in FIG. 3, after autonomous resource selection, the terminal devices 120 and 130 transmit booking messages simultaneously at time Ti. The first resource 301 and the second resource 302 have been selected by the first terminal device 120 and the second terminal device 130 to transmit the first packet and the second packet, respectively. The booking message for indicating the first resource 301 is transmitted by the first terminal device 120 using the resource 321, while the booking message for indicating the second resource 302 is transmitted by the second terminal device 130 using the resource 331. As mentioned above, these booking messages may include the time-frequency location of the respective reserved resources for packet transmission and information related to the packets to be transmitted using the reserved resources. Since the two terminal devices operate in the half-duplex mode, neither of the first and second terminal devices 120 and 130 receives the booking message from the other one.

Another booking message for indicating the second resource 302 is again transmitted by the second terminal device 130 using the resource 332. This time, the first terminal device 120 receives this booking message and determines the second resource 302 which has been reserved by the second terminal device 130. The first terminal device 120 may additionally determine information related to the second packet to be transmitted using the second resource 302, which information may be subsequently used by the first terminal device 120 to compare the transmission priorities.

Then, the first terminal device 120 determines that the first resource 301 (which may be the first resource selected at block 210) collides with the second resource 302. As shown in FIG. 3, the first resource 301 and the second resource 302 are partially overlapped with each other. It is to be understood that the resource collision shown in FIG. 3 is only an example, and the first resource 301 and the second resource 302 may collide with each other in other manner, for example, being fully overlapped.

Still referring to FIG. 2. At block 230, information related to the first and second packets and/or the sending/receiving of booking messages may be used to compare the transmission priorities. Information related to the packets may include QoS attributes and other requirement for the packets to be transmitted, which are collectively referred to as attributes below. For example, these attributes may include at least one of packet priority, reliability, latency, minimum required communication range (which is also referred to as minimum communication range for short) and remaining available selection window (which is also referred to as remaining selection window for short). In different embodiments, different ones of the above attributes may be used by the first terminal device 120.

The packet priority used herein is different from the transmission priority and indicates the priority configured by a higher layer (for example, the application layer) based on e.g. the traffic type of a packet. The packet priority may indicate different priority levels with different integers, such as 0-7. In the case of packet priorities indicated by values of 0-7, a packet priority with a lower value may indicate a higher packet priority.

The latency used herein may indicate the time it takes to transfer a packet from a source to a destination, for example, a time interval between the arrival of a packet from a higher layer and the transmission of the packet. Packets for different traffics may be configured with different latency requirements, such as 1 ms, 5 ms, 10 ms, etc. The reliability used herein may indicate a requirement for the probability that a packet is successfully received. Depending on the types of use cases, the reliability may have different levels, e.g. 90%, 95% or even higher. The minimum communication range used herein may indicate the minimum physical distance to which a packet is required to be transmitted.

In some embodiments, to compare the transmission priorities, the remaining selection window is defined herein to indicate a time period remained for the terminal device (e.g. the terminal device 120) to transmit the packet. Referring to FIG. 3 again. As an example, the remaining selection window 311 represents the remaining selection window for the first packet. The terminal device 120 may determine the remaining selection window 311 based on the arrival time $t_{arrive}$, latency $t_{latency}$ of the first packet and the time $t_{collision}$ when the first terminal device 120 determines the resource collision, for example, the ending time of the resource 332 on which the booking message from the second terminal device 130 is received. The arrival time is used herein to indicate the time when a packet arrives from a higher layer. For example, the remaining selection window 311 may be calculated using the following equation:

$$\text{remaining selection window} = t_{arrive} + t_{latency} - t_{collision} \qquad (1)$$

Similarly, the terminal device 120 may determine the remaining selection window 312 for the second packet based on the arrival time, latency of the second packet and the time when the second terminal device 130 may determine the resource collision, for example, the ending time of the resource 322 on which another booking message for indicating the first resource may be transmitted by the first terminal device 120. The arrival time and latency of the second packet may be included in the booking message received on the resource 332. The first terminal device 120 is able to determine the remaining selection window 312 for the second packet, because the first terminal device 120 may have reserved the resource 322 for transmitting the booking message associated with the first resource 301.

In some embodiments, the terminal device 120 may determine whether the first transmission priority is lower than the second transmission priority, based on attribute information associated with the first and second packets. The attribute information including at least one of: packet priorities of the first and second packets; remaining selection windows for the first and second packets; reliabilities of the first and second packets; latencies of the first and second packets; and minimum communication ranges of the first and second packets. For example, the terminal device 120 may compare at least some of the above mention attributes in a predefined order. Such embodiments will be described in detail below.

In some embodiments, the first terminal device 120 may determine whether the first transmission priority is lower than the second transmission priority based on the transmission priority values for the two terminal devices, and the transmission priority values are determined as a function of at least some of the QoS attributes. Such embodiments will be described in detail below with respect to FIG. 4.

If the first terminal device 120 at block 230 determines that the first transmission priority is lower than the second transmission priority, the process proceeds to block 240. At block 240, the first terminal device 120 selects an available resource from the resource pool to transmit the first packet. Since the first terminal device 120 already has the knowledge of the second resource, it may be ensured that the available resource selected at block 240 does not collide with the second resource. In some embodiments, the first terminal device 120 may select the available resource from the resource pool excluding the second resource (e.g. the second resource 302 shown in FIG. 3) to replace the first resource (e.g. the first resource 301 shown in FIG. 3). In this way, the available resource selected newly selected for the first packet will not be overlapped with the second resource. Thus, in this case, the first terminal device 120 performs resource reselection.

In some embodiments, after selecting at block 240 the available resource for transmitting the first packet, the first terminal device 120 may broadcast information about the newly selected resource. For example, the first terminal device 120 may transmit a booking message for indicating the newly selected resource to notify the other terminal devices which share the same resource pool for example. This booking message is similar with those described above. In the case where the first terminal device 120 performs resource reselection, since the collision between the first resource 301 and the second resource 302 has been resolved, the first terminal device 120 may not transmit the second booking message (which would otherwise be transmitted using the resource 322) for indicating the first resource 301.

If the first terminal device 120 determines at block 230 that the first transmission priority is higher than the second transmission priority, this means that the first terminal device 120 will use the first resource selected at the block 210 to transmit the first packet. In this case, the first terminal device 120 will not perform the resource reselection. Accordingly, the first terminal device 120 will transmit the second booking message for indicating the first resource, for example using the resource 322 shown in FIG. 3. After receiving the second booking message, the second terminal device 130 may perform similar actions as described with respect to block 230. Since the same rule is employed at the first terminal device 120 and the second terminal device 130, the second terminal device 130 in this case may determine that the second transmission priority associated with the second packet is lower than the first transmission priority associated with the first packet. The second terminal device 130 may then select an available resource from the resource pool to transmit the second packet.

As mentioned above, in some embodiments, the first terminal device 120 may determine whether to perform the resource reselection or not by comparing attributes associated with the first and second packets in accordance with a predefined order. Such embodiments now are described in detail.

As an example, the predefined order of the attributes associated with the first and second packets may be defined as the following:

$$\text{packet priority} \geq \text{remaining selection window} \geq \text{reliability} \geq \text{latency (if needed)} \geq \text{minimum communication range (if agreed)} \geq \text{sending/receiving time of the booking message (if necessary)} \quad (2)$$

If this predefined order is employed, the first terminal device 120 may first compare the packet priorities of the first and second packets. For example, the first terminal device 120 may first compare the packet priority of the first packet and the packet priority of the second packet. If the comparison result indicates that the packet priority of the first packet is lower than the packet priority of the second packet, the first terminal device 120 may determine that the first transmission priority is lower than the second transmission priority. Thus, the first terminal device 120 will perform resource reselection. In this way, more favored radio-layer conditions is given to higher priority traffics.

If the comparison result indicates that the packet priority of the first packet is higher than the packet priority of the second packet, the first terminal device 120 may determine that the first transmission priority is higher than the second transmission priority. Thus, the first terminal device 120 will not perform resource reselection and will transmit the first packet using the first resource.

If the comparison result indicates that the packet priority of the first packet is the same as the packet priority of the second packet, then the comparison may be moved to next item in the equation (2). The first terminal device 120 may continue to compare the remaining selection window for the first packet and the remaining selection window for the second packet. If the comparison result indicates that the remaining selection window for the first packet is longer than the remaining selection window for the second packet, the first terminal device 120 may determine that the first transmission priority is lower than the second transmission priority. Thus, the first terminal device 120 will perform resource reselection.

If the comparison result indicates that the remaining selection window for the first packet is smaller than the remaining selection window for the second packet, the first terminal device 120 may determine that the first transmission priority is higher than the second transmission priority.

Thus, the first terminal device 120 will not perform resource reselection and will transmit the first packet using the first resource.

If the comparison result indicates that the remaining selection window for the first packet is the same as the remaining selection window for the second packet, then the comparison will be moved to next item, i.e. reliabilities of the first and second packets, and so on. It is to be noted that a higher reliability, a shorter latency or a shorter minimum communication range may indicate a higher transmission priority.

If the comparisons on the first five attributes in equation (2) provide a result which indicates that the first transmission priority is the same as the second transmission priority, then the sending/receiving time of the booking message can be used. Take the case shown in FIG. 3 as an example. For the first terminal device 120, the receiving time of the booking message received on the resource 332 precedes the sending time of the booking message to be transmitted on the resource 322. Thus, the first terminal device 120 may determine that the first transmission priority is lower than the second transmission priority. The first terminal device 120 may drop the previously reserved resource 301 and perform resource reselection.

It is to be understood that if the resource collision is determined based on other information, then the receiving/sending time of that information may be used in a similar way.

As another example, the predefined order of the attributes associated with the first and second packets may be defined as the following:

$$\text{remaining selection window} \geq \text{packet priority} \geq \text{reliability} \geq \text{latency (if needed)} \geq \text{minimum communication range (if agreed)} \geq \text{sending/receiving time of the booking message (if necessary)} \quad (3)$$

If this predefined order shown in equation (3) is employed, the first terminal device 120 may first compare the remaining selection windows of the first and second packets and then the packet priorities (if necessary). For example, the first terminal device 120 may first compare the remaining selection window for the first packet and the remaining selection window for the second packet. If the comparison result shows that the remaining selection window for the first packet is longer than the remaining selection window for the second packet, the first terminal device 120 may determine that the first transmission priority is lower than the second transmission priority. Thus, the first terminal device 120 will perform resource reselection.

If the comparison result indicates that the remaining selection window for the first packet is smaller than the remaining selection window for the second packet, the first terminal device 120 may determine that the first transmission priority is higher than the second transmission priority. Thus, the first terminal device 120 will not perform resource reselection and will transmit the first packet using the first resource.

If the comparison result indicates that the remaining selection window for the first packet is the same as the remaining selection window for the second packet, then the comparison may be moved to next item in the equation (3). The first terminal device 120 may continue to compare the packet priority of the first packet and the packet priority of the second packet. If the comparison result indicates that the packet priority of the first packet is lower than the packet priority of the second packet, the first terminal device 120 may determine that the first transmission priority is lower than the second transmission priority. Thus, the first terminal device 120 will perform resource reselection.

Similar rules with those described above with respect to the predefined order shown in equation (2) apply to the predefined order shown in equation (3). Thus, no more detailed description is repeated in this regard.

In the predefined orders shown in equations (2) and (3), high priority is given to the attribute of the remaining selection window, which is a function of the latency attribute. Therefore, the latency attribute may not be considered.

In some other embodiments, instead of the remaining selection window, the latency attribute may be given a higher priority in the predefined order. As an example, the predefined order of the attributes associated with the first and second packets may be defined as the following:

$$\text{packet priority} \geq \text{latency} \geq \text{reliability} \geq \text{minimum communication range (if agreed)} \geq \text{sending/receiving time of the booking message (if necessary)} \quad (4)$$

If this predefined order is employed, the first terminal device 120 may first compare the packet priorities of the first and second packets. For example, the first terminal device 120 may first compare the packet priority of the first packet and the packet priority of the second packet. If the comparison result indicates that the packet priority of the first packet is lower than the packet priority of the second packet, the first terminal device 120 may determine that the first transmission priority is lower than the second transmission priority. Thus, the first terminal device 120 will perform resource reselection. In this way, more favored radio-layer conditions are given to higher priority traffics.

If the comparison result indicates that the packet priority of the first packet is higher than the packet priority of the second packet, the first terminal device 120 may determine that the first transmission priority is higher than the second transmission priority. Thus, the first terminal device 120 will not perform resource reselection and will transmit the first packet using the first resource.

If the comparison result indicates that the packet priority of the first packet is the same as the packet priority of the second packet, then the comparison may be moved to next item in the equation (4). The first terminal device 120 may continue to compare the latency of the first packet and the latency of the second packet. If the comparison result indicates that the latency of the first packet is larger than the latency of the second packet, the first terminal device 120 may determine that the first transmission priority is lower than the second transmission priority. Thus, the first terminal device 120 will perform resource reselection.

Similar rules with those described above with respect to the predefined order shown in equation (2) apply to the predefined order shown in equation (4). Thus, no more detailed description is repeated in this regard.

As a further example, the predefined order of the attributes associated with the first and second packets may be defined as the following:

$$\text{latency} \geq \text{packet priority} \geq \text{reliability} \geq \text{minimum communication range (if agreed)} \geq \text{sending/receiving time of the booking message (if necessary)} \quad (5)$$

If this predefined order is employed, the first terminal device 120 may first compare the latencies of the first and second packets. For example, the first terminal device 120 may first compare the latency of the first packet and the latency of the second packet. If the comparison result indicates that the latency of the first packet being larger than the latency of the second packet is larger than the latency of the second packet, the first terminal device 120 may determine that the first transmission priority is lower than the second transmission priority. Thus, the first terminal device 120 will perform resource reselection.

If the comparison result indicates that the latency of the first packet is smaller than the latency of the second packet, the first terminal device 120 may determine that the first transmission priority is higher than the second transmission priority. Thus, the first terminal device 120 will not perform resource reselection and will transmit the first packet using the first resource.

If the comparison result indicates that the latency of the first packet is the same as the latency of the second packet, then the comparison may be moved to next item in the equation (5). The first terminal device 120 may continue to compare the packet priority of the first packet and the packet priority of the second packet. If the comparison result indicates that the packet priority of the first packet is lower than the packet priority of the second packet, the first terminal device 120 may determine that the first transmission priority is lower than the second transmission priority. Thus, the first terminal device 120 will perform resource reselection.

Similar rules with those described above with respect to the predefined order shown in equation (2) apply to the predefined order shown in equation (5). Thus, no more detailed description is repeated in this regard.

Embodiments where the terminal device determines whether to perform resource reselection or not by comparing attributes in accordance with a predefined order are described above. As mentioned above, in some other embodiments, transmission priority values can be used to determine whether to perform resource reselection or not. Such embodiments are now described in detail.

A global transmission priority function may be defined to determine the transmission priority values, which may be a function of at least two of the packet priority, latency and reliability. As three examples, the global transmission priority function F may be defined in accordance with one of the following equations:

$$F(P, L, R) = \frac{\alpha}{P} \cdot \frac{\beta}{L} \cdot \frac{\gamma}{1-R} \quad (6)$$

$$F(P, L, R) = \frac{\alpha}{P} \cdot \frac{\beta}{L} \cdot \gamma lg \frac{1}{1-R} \quad (7)$$

$$F(P, L, R) = \frac{\alpha}{P} \cdot \frac{\beta}{L} + \gamma lg \frac{1}{1-R} \quad (8)$$

where P, L and R represents the packet priority, latency and reliability, respectively and α, β, γ represents constant factors. For example, α may be a median of the packet priorities (such as 4, in the case of packet priorities of 1-8). Further, β and γ may take the values of 10 and 1/100, respectively.

It is to be understood that the values of α, β, γ are only for discussion purpose without any limitation. It is also to be understood that the equations (6)-(8) are only for discussion and a person skilled in the art will envisage other equations to define the global transmission priority function. For example, only two of the packet priority, latency and reliability may be used to define the global transmission priority function. In some embodiments, instead of the latency or in addition to the latency, the remaining selection window may be used.

Figure 4:
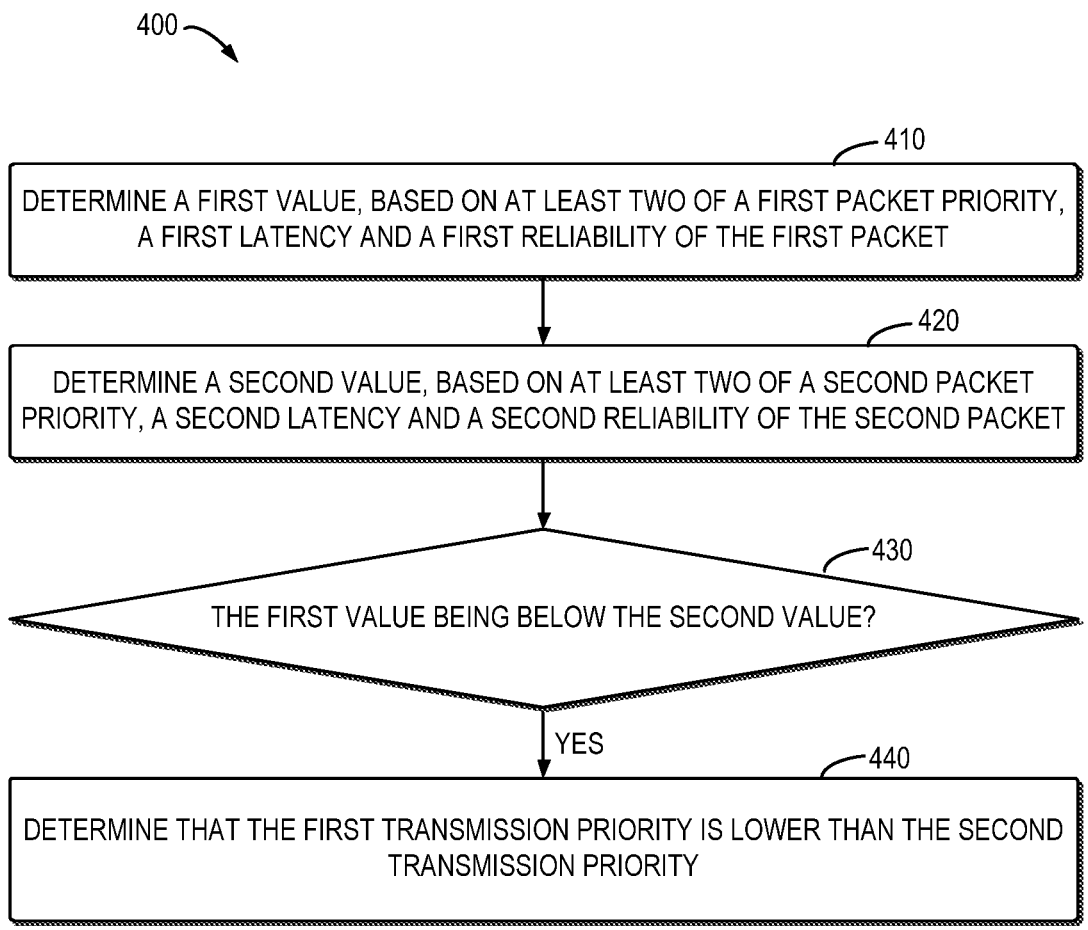
FIG. 4 shows a flowchart of an example method in accordance with some embodiments of the present disclosure.

FIG. 4 illustrates a flowchart of an example method 400 in accordance with some embodiments of the present disclosure. It is to be understood that the method 400 may include additional blocks not shown and/or may omit some blocks as shown, and the scope of the present disclosure is not limited in this regard. The method 400 can be implemented at a terminal device, such as the terminal device 120 as shown in FIG. 1. Additionally or alternatively, the method 400 can also be implemented at the terminal device 130, as well as other the terminal devices not shown in FIG. 1. Only for the purpose of discussion, the method 400 will be described with reference to FIG. 1 as performed by the terminal device 120.

At block 410, the first terminal device 120 may determine a first value, based on at least two of a first packet priority, a first latency and a first reliability of the first packet. For example, the first terminal device 120 may determine a first transmission priority value F1 using one of the equations (6)-(8), such as the equation (6).

At block 420, the first terminal device 120 may determine a second value, based on at least two of a second packet priority, a second latency and a second reliability of the second packet. For example, the first terminal device 120 may determine a second transmission priority value F2 with the equation used at block 410, such as the equation (6).

At block 430, the first terminal device 120 may determine whether the first value F1 is below the second value F2. If the first value F1 is below the second value F2, the process proceed to block 440. At block 440, the first terminal device 120 may determine that the first transmission priority is lower than the second transmission priority. Thus, the first terminal device 120 may perform resource reselection.

If the first value F1 is above the second value F2, the first terminal device 120 may determine that the first transmission priority is higher than the second transmission priority. As a result, the first terminal device 130 will not perform resource reselection and will transmit the first packet using the first resource.

If the first value F1 is equal to the second value F2, the first terminal device 120 may use the sending/receiving time of the booking message or other information used to determine the resource collision, as described above.

Figure 5:
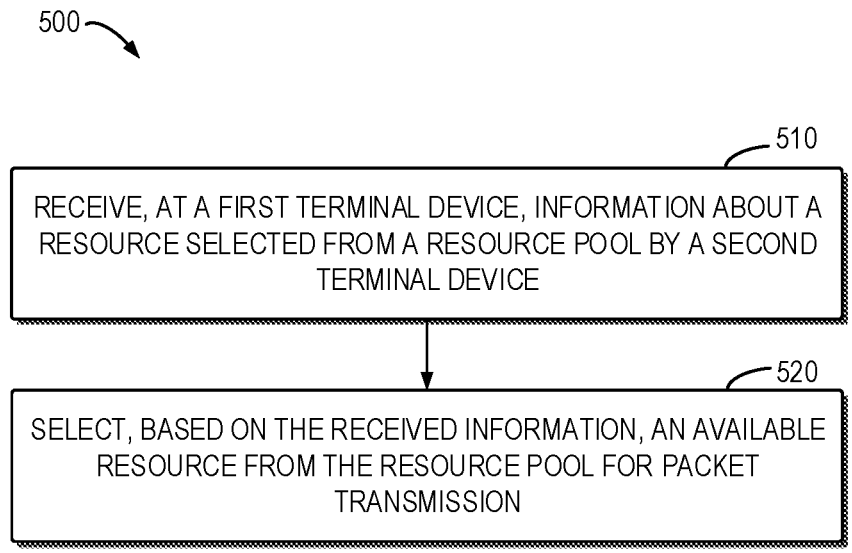
FIG. 5 illustrates a flowchart of an example method in accordance with some embodiments of the present disclosure.

Embodiments where a terminal device select a resource for packet transmission based on information from other terminal device(s) are now described. FIG. 5 illustrates a flowchart of an example method 500 in accordance with some embodiments of the present disclosure. It is to be understood that the method 500 may include additional blocks not shown and/or may omit some blocks as shown, and the scope of the present disclosure is not limited in this regard. The method 500 can be implemented at a terminal device, such as the terminal device 120 as shown in FIG. 1. Additionally or alternatively, the method 500 can also be implemented at the terminal device 130, as well as other the terminal devices not shown in FIG. 1. Only for the purpose of discussion, the method 500 will be described with reference to FIG. 1 as performed by the terminal device 120.

At block 510, the first terminal device 120 receives information about a resource selected from a resource pool by a second terminal device 130. The information may be broadcast by the second terminal device 130 or may be included a message transmitted by the second terminal device 130, such as the booking message mentioned above. The information about the resource may include the time-frequency location of the resource. The resource selected by the second terminal device 130 may be reserved or used for transmitting a packet. Thus, the message may additionally include information about the packet to be transmitted by the second terminal device 130, such as the QoS attributes.

At block 520, the first terminal device 120 selects, based on the received information, an available resource from the resource pool for packet transmission. For example, the first terminal device 120 may determine the time-frequency location of the resource reserved by the second terminal device 130, based on the information received at block 510. Then the first terminal device 120 may select the available resource from the resource pool such that the available resource selected does not collide with the resource selected by the second terminal device 130. In this way, resource collision between the first terminal device 120 and the second terminal device 130 can be avoided.

Figure 6:
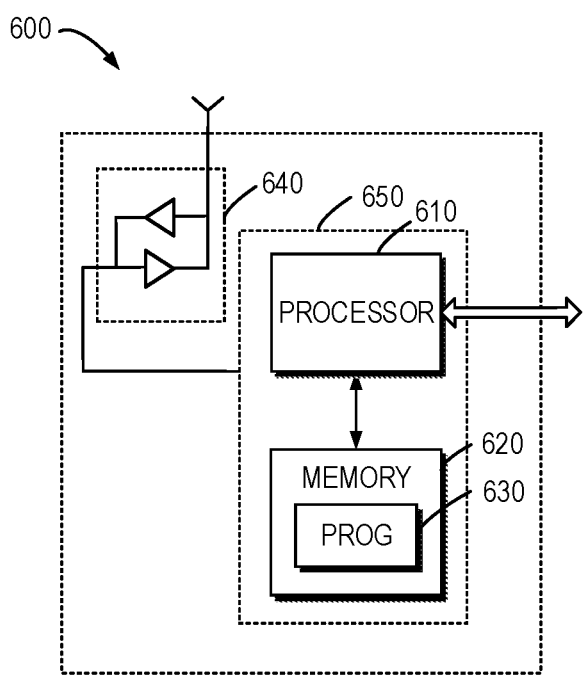
FIG. 6 is a simplified block diagram of a device that is suitable for implementing embodiments of the present disclosure.

FIG. 6 is a simplified block diagram of a device 600 that is suitable for implementing embodiments of the present disclosure. The device 600 can be considered as a further example implementation of the first terminal device 120 or the second terminal device 130 as shown in FIG. 1A. Accordingly, the device 600 can be implemented at or as at least a part of the first terminal device 120 or the second terminal device 130.

As shown, the device 600 includes a processor 610, a memory 620 coupled to the processor 610, a suitable transmitter (TX) and receiver (RX) 640 coupled to the processor 610, and a communication interface coupled to the TX/RX 640. The memory 610 stores at least a part of a program 630. The TX/RX 640 is for bidirectional communications. The TX/RX 640 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 630 is assumed to include program instructions that, when executed by the associated processor 610, enable the device 600 to operate in accordance with the embodiments of the present disclosure, as discussed herein with reference to FIG. 2 and FIG. 4. The embodiments herein may be implemented by computer software executable by the processor 610 of the device 600, or by hardware, or by a combination of software and hardware. The processor 610 may be configured to implement various embodiments of the present disclosure. Furthermore, a combination of the processor 610 and memory 610 may form processing means 650 adapted to implement various embodiments of the present disclosure.

The memory 610 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 610 is shown in the device 600, there may be several physically distinct memory modules in the device 600. The processor 610 may be of any type suitable to the local technical network, and may include one or more of general-purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2 and 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a first terminal, comprising:
   transmitting a first information about a first resource for transmitting a first packet from a resource pool;
   in response to the first resource colliding with a second resource from the resource pool for transmitting a second packet indicated by a received second information, determining whether a first transmission priority associated with the first packet is lower than a second transmission priority associated with the second packet; and
   in response to determining that the first transmission priority is lower than the second transmission priority, selecting an available resource from the resource pool to transmit the first packet.

2. The method of claim 1, further comprising:
   in response to determining that the first transmission priority is higher than the second transmission priority, transmitting the first packet using the first resource.

3. The method of claim 1, wherein selecting the available resource from the resource pool comprises:
   selecting the available resource from the resource pool to replace the first resource.

4. The method of claim 1, wherein determining whether the first transmission priority is lower than the second transmission priority comprises:
   determining whether the first transmission priority is lower than the second transmission priority, based on attribute information associated with the first and second packets, the attribute information including at least one of:
      packet priorities of the first and second packets, a packet priority of the first packet indicating a priority configured by a higher layer;
      remaining selection windows for the first and second packets, a remaining selection window for the first packet indicating a time period remained for the first terminal device to transmit the first packet;
      reliabilities of the first and second packets;
      latencies of the first and second packets; and
      minimum communication ranges of the first and second packets.

5. The method of claim 4, wherein determining whether the first transmission priority is lower than the second transmission priority based on the attribute information comprises:
   comparing the packet priority of the first packet and a packet priority of the second packet; and
   in response to the packet priority of the first packet being lower than the packet priority of the second packet, determining that the first transmission priority is lower than the second transmission priority.

6. An apparatus, comprising:
   a transmitter;
   a receiver; and
   one or more processors coupled to the transmitter and receiver, and configured to cause the apparatus to:
      transmit a first information about a first resource for transmitting a first packet from a resource pool;
      in response to the first resource colliding with a second resource from the resource pool for transmitting a second packet indicated by a received second information, determine whether a first transmission priority associated with the first packet is lower than a second transmission priority associated with the second packet; and
      in response to determining that the first transmission priority is lower than the second transmission priority, select an available resource from the resource pool to transmit the first packet.

7. The apparatus of claim 6, wherein the one or more processors are further configured to, cause the apparatus to:
   in response to determining that the first transmission priority is higher than the second transmission priority, transmitting the first packet using the first resource.

8. The apparatus of claim 6, wherein the one or more processors are further configured to cause the apparatus to:
   select the available resource from the resource pool to replace the first resource.

9. A computer readable medium having instructions stored thereon, the instructions, when executed on at least one processor, causing the at least one processor to carry out a method, the method comprising:
   transmitting a first information about a first resource for transmitting a first packet from a resource pool;
   in response to the first resource colliding with a second resource from the resource pool for transmitting a second packet indicated by a received second information, determining whether a first transmission priority associated with the first packet is lower than a second transmission priority associated with the second packet; and
   in response to determining that the first transmission priority is lower than the second transmission priority, selecting an available resource from the resource pool to transmit the first packet.

* * * * *